United States Patent
Chitti et al.

(10) Patent No.: US 10,382,952 B2
(45) Date of Patent: Aug. 13, 2019

(54) GENERATING AND UTILIZING A SECONDARY SECURITY KEY

(71) Applicant: International Business Machines Corporation, Armonk, NY (US)

(72) Inventors: Mark V. Chitti, Lexington, KY (US); Kirby G. Dahman, Seattle, WA (US); Ronda L. McCain, Longmont, CO (US); Kurt A. Rybczyk, Waterbury, CT (US); Keith C. Williams, Fenton, MO (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 15/158,912

(22) Filed: May 19, 2016

(65) Prior Publication Data
US 2017/0338953 A1  Nov. 23, 2017

(51) Int. Cl.
| | | |
|---|---|---|
| *G06F 11/30* | (2006.01) | |
| *G06F 12/14* | (2006.01) | |
| *H04W 12/04* | (2009.01) | |
| *H04L 29/06* | (2006.01) | |
| *H04L 9/08* | (2006.01) | |
| *H04W 12/02* | (2009.01) | |

(52) U.S. Cl.
CPC ........... *H04W 12/04* (2013.01); *H04L 9/0863* (2013.01); *H04L 9/0891* (2013.01); *H04L 9/0894* (2013.01); *H04L 63/0428* (2013.01); *H04L 63/061* (2013.01); *H04W 12/02* (2013.01)

(58) Field of Classification Search
CPC ... H04L 9/0861; H04L 63/0428; H04L 63/06; H04L 63/061; H04L 9/0894; H04L 9/0863; H04L 9/0891; H04W 12/04; H04W 12/02
See application file for complete search history.

(56) References Cited

U.S. PATENT DOCUMENTS

| | | |
|---|---|---|
| 4,417,338 A | 12/1983 | Davida |
| 5,940,507 A | 8/1999 | Cane et al. |
| 6,243,811 B1 | 6/2001 | Patel |
| 2006/0235846 A1* | 10/2006 | Murray ............ G06F 17/30985 |
| 2007/0064933 A1* | 3/2007 | Bantwal .................. G09C 1/02 380/37 |

(Continued)

OTHER PUBLICATIONS

P. Mell et al., "The NIST Definition of Cloud Computing", National Institute of Standards and Technology, Information Technology Laboratory, Sep. 2011, pp. 1-7.

*Primary Examiner* — Trong H Nguyen
*Assistant Examiner* — Amie C. Lin
(74) *Attorney, Agent, or Firm* — Yee & Associates, P.C.; Maeve Carpenter (57) ABSTRACT

A method, system, and/or computer program product generate a secondary security key from a primary security key. One or more processors, receive a primary security key. The processor(s) retrieve a first numeric code that is an alternate numeric representation of a first character in the primary security key. The processor(s) retrieve a second numeric code that is an alternate numeric representation of a second character in the primary security key. The processor(s) add the first numeric code to the second numeric code to generate a running total value. The processor(s) designate the running total value as a secondary security key, and encrypt data with the secondary security key.

20 Claims, 4 Drawing Sheets

(56) References Cited

U.S. PATENT DOCUMENTS

2007/0116270 A1* 5/2007 Fischer .................. G06F 7/722
　　　　　　　　　　　　　　　　　　　　　　380/30
2016/0061627 A1* 3/2016 Tan ......................... G07C 5/00
　　　　　　　　　　　　　　　　　　　　　　702/85

* cited by examiner

GENERATING AND UTILIZING A SECONDARY SECURITY KEY

BACKGROUND

The present disclosure relates to the field of computers, and specifically to computers that exchange and/or use encrypted data. Still more specifically, the present invention relates to generating and using security keys.

SUMMARY

A method, system, and/or computer program product generate a secondary security key from a primary security key. One or more processors receive a primary security key. The processor(s) retrieve a first numeric code that is an alternate numeric representation of a first character in the primary security key. The processor(s) retrieve a second numeric code that is an alternate numeric representation of a second character in the primary security key. The processor(s) add the first numeric code to the second numeric code (or optionally, subtract the second numeric code from the first numeric code) to generate a running total value. The processor(s) designate the running total value as a secondary security key, and encrypt data with the secondary security key.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
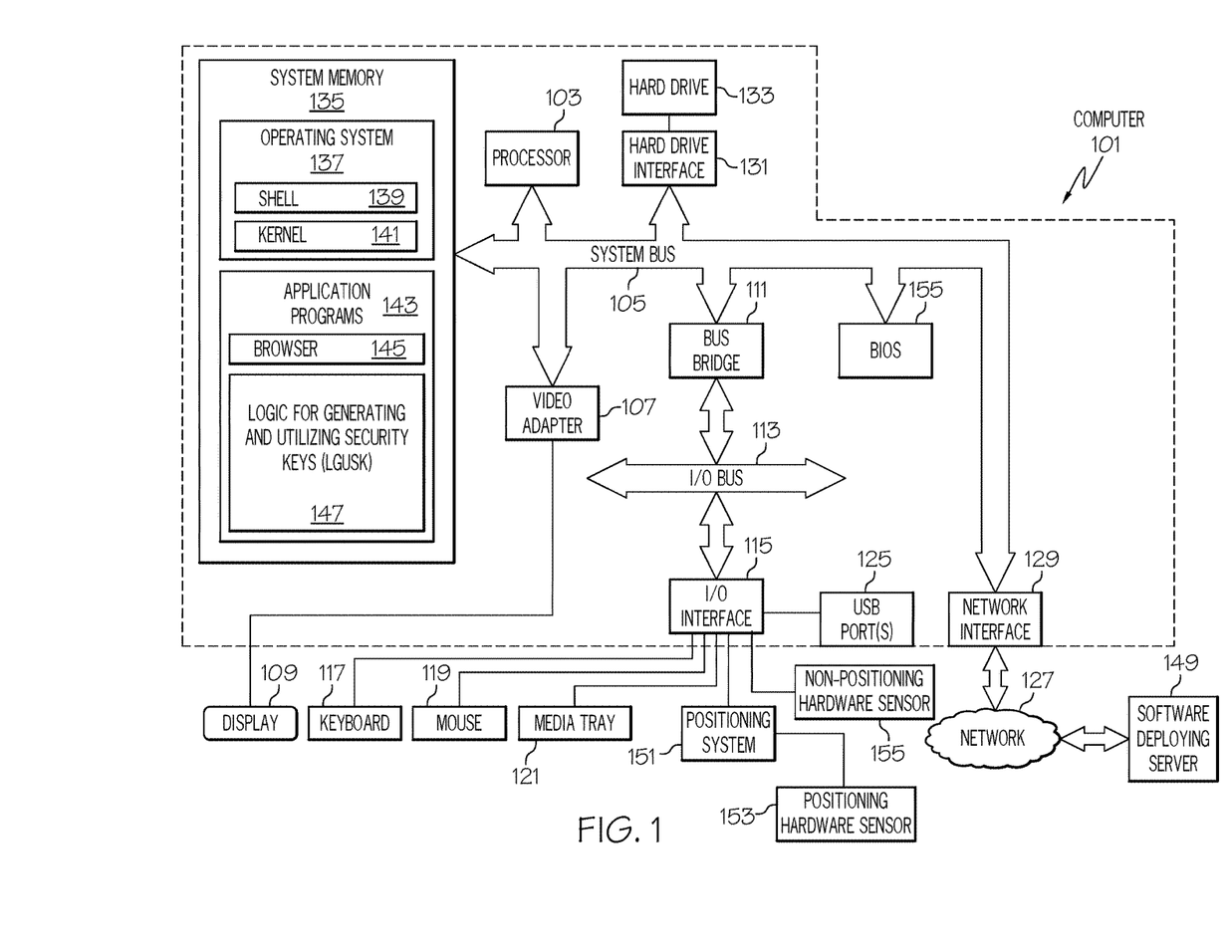
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Generating and Utilizing Security Keys (LGUSK) 147. LGUSK 147 includes code for implementing the processes described below, including those described in FIG. 2. In one embodiment, computer 101 is able to download LGUSK 147 from software deploying server 149, including in an on-demand basis. In one embodiment, software deploying server 149 is able to execute one or more instructions from LGUSK 147 and provide the results to computer 101, thus relieving computer 101 from the need to utilize its internal processing power.

Also coupled to system bus 105 is a basic input/output system (BIOS) 155, which is a chip that is statically loaded with a program that processor 103 uses to start the computer 101, manages data flow between operating system 137 and attached devices such as display 109, keyboard 117, mouse 119, hard drive 133, etc.

Also coupled to I/O interface 115 is a positioning system 151, which determines a position of computer 101 and/or other devices using positioning hardware sensor 153. Positioning hardware sensor 153 may be any type of hardware sensor that is able to determine a position of a device, including computer 101 and/or client computer 202 shown in FIG. 2. Positioning hardware sensor 153 may utilize, without limitation, satellite based positioning devices (e.g., global positioning system—GPS based devices), accelerometers (to measure change in movement), barometers (to measure changes in altitude), etc.

Also associated with computer 101 is non-positioning hardware sensor 155. Examples of non-positioning hardware sensor 155 include, but are not limited to, light meters, thermometers, noise meters, biometric sensors, etc. that are able to detect physical conditions such as light, sound, temperature, vibration, etc. within and/or around computer 101.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
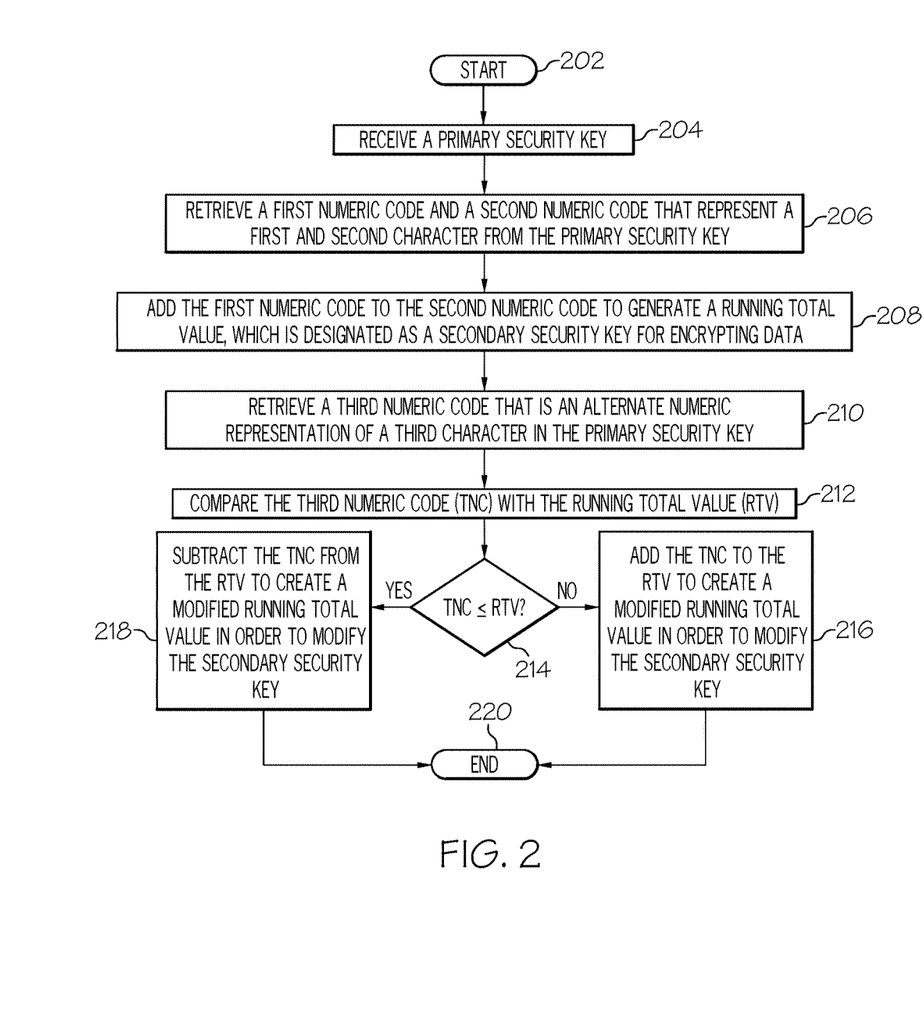
FIG. 2 is a high-level flow chart of one or more steps performed by one or more computing and/or other hardware devices to generate and utilize a secondary security key.

With reference now to FIG. 2, a high-level flow chart of one or more steps performed by one or more computing and/or other hardware devices to generate and utilize a secondary security key is presented.

After initiator block 202, one or more processors receive a primary security key, as described in block 204. Primary security key is a software key that can be utilized to encrypt and/or decrypt network transmissions (e.g., data transmissions, logins, etc.) and/or stored data. The primary security key may be generated by a user entering a password, etc. For example, the primary security key may be the string of characters "ABC", which are then used to encrypt/decrypt transmissions/data. Thus, as used herein the terms "security key" and "encryption key" and "decryption key" are used interchangeably to describe a string (e.g., a binary string of ones and zeros) that is used encrypt and/or decrypt data.

In this example, the characters "A", "B", and "C" may be represented by alternative numeric representations, such as American Standard Code for Information Interchange (ASCII) values. For example, in the ASCII schema, the ASCII numeric value for "A" is 65 (decimal), the ASCII numeric value for "B" is "66", and the ASCII numeric value for "C" is "67". Thus, when a user types in "A", the computer converts this into the binary string of 01000001 (equivalent to $65_{dec}$, which is used by the computer in storing, manipulating, etc. the input.

Thus, as described in block 206, the processor(s) retrieve a first numeric code (e.g., $65_{dec}$ expressed in binary) that is an alternate numeric representation of a first character (e.g., "A") in the primary security key, and a second numeric code (e.g., $66_{dec}$) that is an alternate numeric representation of a second character (e.g., "B") in the primary security key. In one embodiment, "B" immediately follows "A" in the primary security key, such that the first character ("A") and the second character ("B") are in sequential order within the primary security key ("ABC").

As described in block 208, the processor(s) then add the first numeric code ($65_{dec}$) to the second numeric code ($66_{dec}$) to generate a running total value ($131_{dec}$). This running total value ($131_{dec}$) is then designated a secondary security key.

As described in block 210, in one embodiment, the processor(s) continue examining the characters in the primary security key ("ABC") in order to retrieve a third numeric code (e.g., $67_{dec}$ for "C") that is an alternate numeric representation of a third character (e.g., "C") in the primary security key ("ABC").

As described in block 212, the processor(s) compare the third numeric code ($67_{dec}$) with the running total value derived from "A" and "B" ($65_{dec}+66_{dec}=131_{dec}$).

As shown in query block 214, a query is made by the processor(s) as to whether the third numeric code (TNC) is less than or equal to the running total value. If so (e.g., the ASCII value "C" is less than or equal to the total running value of the summed ASCII values of A+B), then the third numeric code is added to the total running value (as described above when adding the values for "A" and "B" for creating the initial running total value of $131_{dec}$) in order to create a modified running total value (i.e., $131_{dec}+67_{dec}=198_{dec}$). This modified running total value ($198_{dec}$) is then used as the secondary security key for encrypting and decrypting data, as described in query block 216.

However, if the third numeric code is less than the running total value (e.g., the value of $67_{dec}$ for "C" is less than or equal to the total running value of $131_{dec}$ created by adding $65_{dec}$ to $66_{dec}$), then the third numeric code ($67_{dec}$) is subtracted from the total running value ($131_{dec}$) to create the modified running total value (i.e., $131_{dec}-67_{dec}=64_{dec}$), as described in block 218. This modified running total value ($64_{dec}$) is then used as the secondary security key for encrypting and decrypting data.

Thus in one or more embodiments of the present invention, the secondary security key is generated by adding or subtracting numeric codes associated with the primary security key. That is, each numeric code (e.g., ASCII value) for each character in the primary security key is compared with the running total value of summed numeric codes (even if only from one character in the primary security key). If the numeric code for the next character in the primary security key is greater than the sum of the numeric codes for all preceding characters in the primary security key, then that numeric code is added to the running total value. However, if the numeric code for the next character in the primary security key is less than the sum of the numeric codes for all preceding characters in the primary security key, then that numeric code is subtracted from the running total value. Thus, one or more embodiments of the present invention generate generate a new code that is within the allowed character code value range for the associated character set. In one or more embodiments of the present invention, the associated character set is thus vastly different for the same set of characters (i.e., the associated character set has characters in a vastly different order of appearance).

Alternatively, the secondary security key is simply the sum of all numeric codes (e.g., ASCII values) of all of the characters in the primary security key.

Once the secondary security key is generated, it is used to encrypt or decrypt data using any encryption technique desired, including but not limited to simply overlaying the secondary security key on top of the data using an exclusive OR (XOR) hardware logic.

Thus, the present invention allows a user and/or system to create a primary security key, from which the system automatically generates the secondary security key without user intervention and/or even knowledge thereof, thus providing a more secure and thus improved computer system, while maintaining ease of use for the user.

The flow-chart ends at terminator block 220.

Once the data is encrypted using the secondary security key, it can subsequently be decrypted using this same secondary security key, assuming that that the secondary security key is available to the system/user.

In an embodiment of the present invention, the secondary security key is generated with the use of outputs from a hardware sensor, such as the positioning hardware sensor 153 and/or non-positioning hardware sensor 155 shown in FIG. 1. For example, assume that positioning hardware sensor 153 outputs a set of GPS coordinates that identify the current location of computer 101, or that non-positioning hardware sensor 155 identifies the current ambient temperature within or around the computer 101 as being a certain temperature (e.g., 100 degrees Fahrenheit). In this embodiment, these sensor readings are used to further modify the secondary security key.

That is, the processor(s) in computer 101 receive an output of a hardware sensor (e.g., positioning hardware sensor 153 or non-positioning hardware sensor 155 shown in FIG. 1). The processor(s) then designate the output of the hardware sensor as a divisor. For example, if the output of the non-positioning hardware sensor 155 is 95 (e.g., for 95 degrees Fahrenheit), then the value of "95" will be a divisor for dividing the running total value. That is, if the running total value is 198, then 198 will be the dividend and 95 will be the divisor in the equation 198/95=2 mod 8, where "2" is the quotient and "8" (mod 8) is the remainder. That is, 198 divided by 95 equals 2 with a remainder of 8.

The processors then associate this remainder (8) with a particular mathematical operation, such as "add X to Y". That is, a table shows an association of remainders with certain mathematical operations. In this case, the remainder (modulo) is "8", and the mathematical operation associated with "8" is "add X to Y". In this case, "Y" is secondary security key.

"X" can be derived in various ways.

For example, "X" may simply by the remainder (e.g., "8").

Alternatively, "X" may be derived from another operation. That is, a lookup table may match the remainder "8" to a particular operation, such as "take the square root of the output of positioning hardware sensor 153" in order to obtain "X".

Alternatively, "X" may be from a lookup table (e.g., a table that matches the remainder "8" to another value such as "24") in order to obtain "X".

The derived/obtained mathematical operation is then executed by the processor(s) on the running total value to modify the secondary security key.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
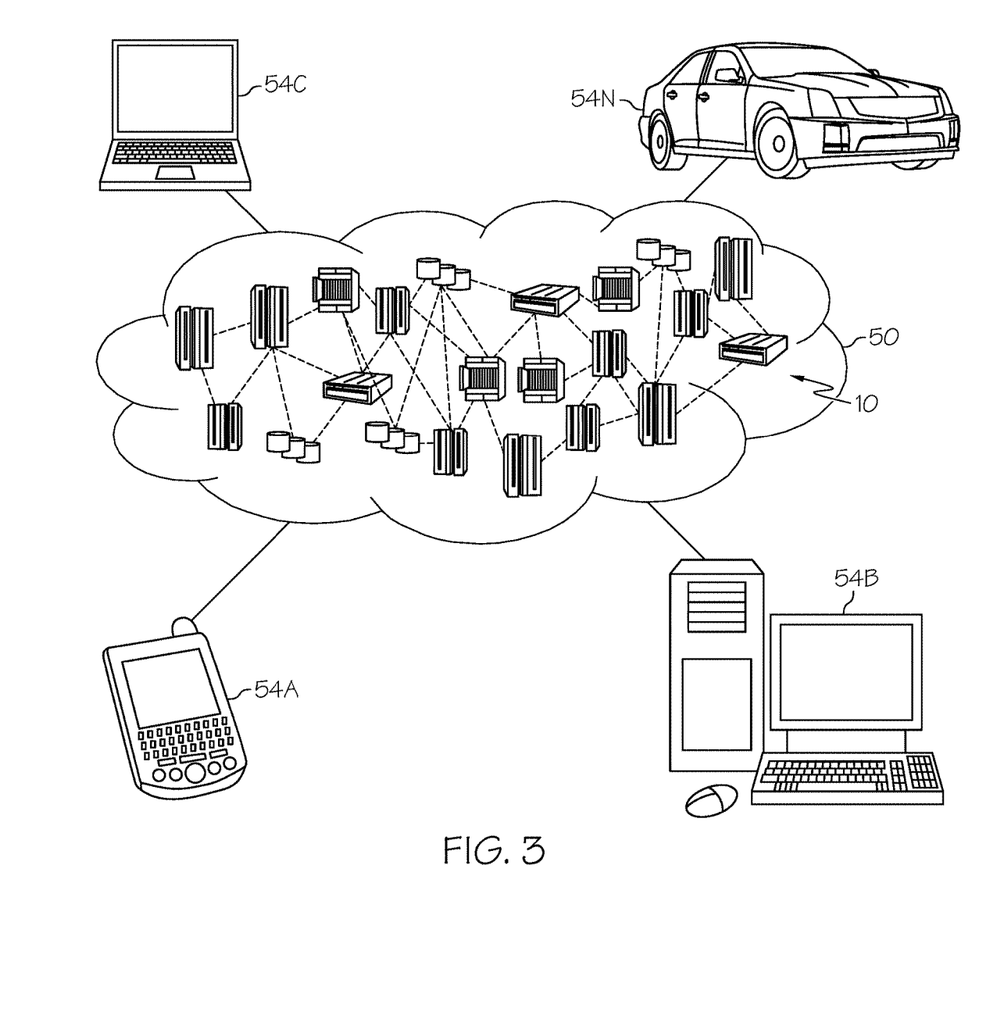
FIG. 3 depicts a cloud computing environment according to an embodiment of the present invention.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 3 are intended to be illustrative only and that computing nodes 10 and cloud computing environment 50 can communicate with any type of computerized device over any type of network and/or network addressable connection (e.g., using a web browser).

Figure 4:
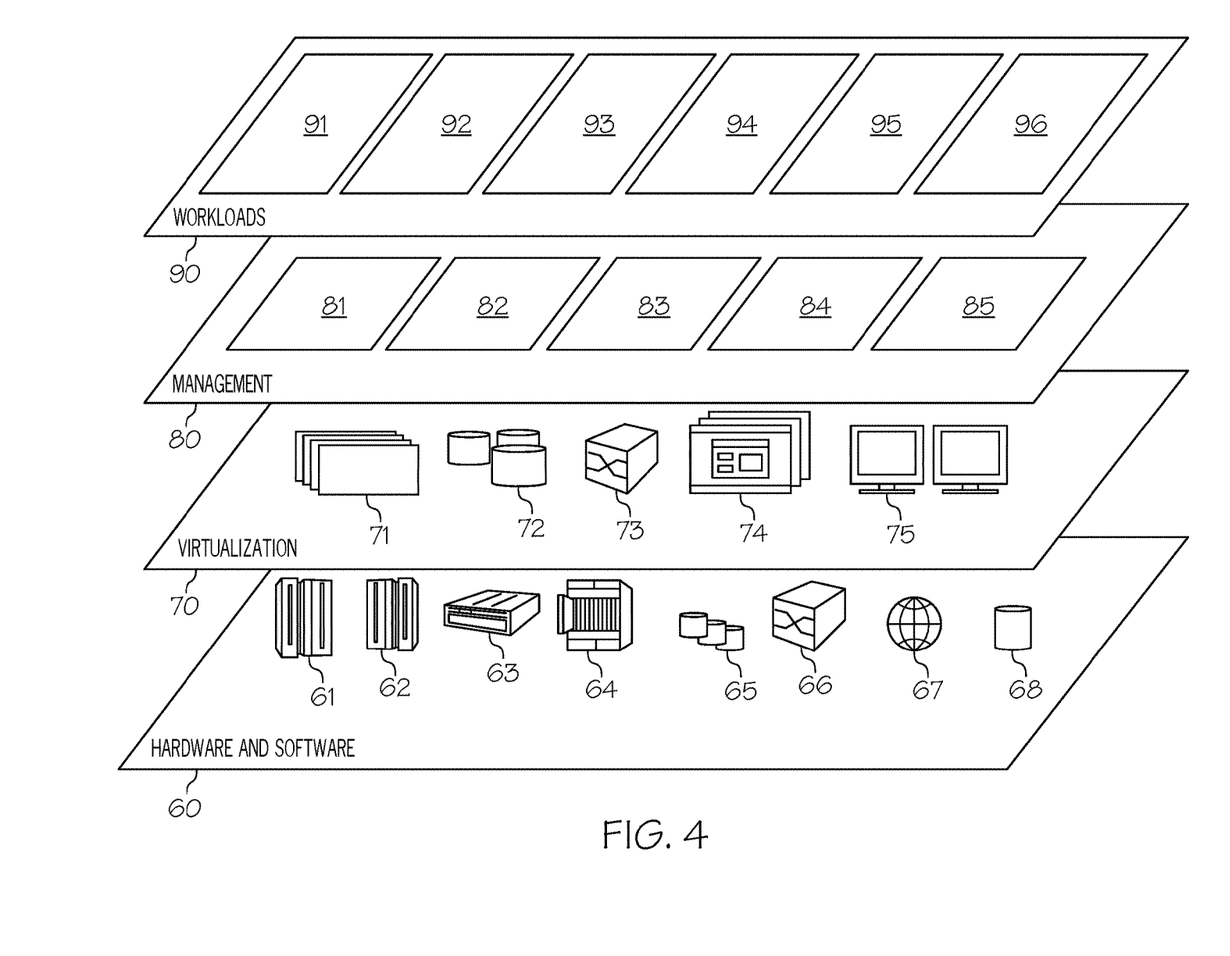
FIG. 4 depicts abstraction model layers of a cloud computer environment according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encryption key generation and utilization processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by one or more processors, a primary security key;
   retrieving, by the one or more processors, a first numeric code that is an alternate numeric representation of a first character in the primary security key;
   retrieving, by the one or more processors, a second numeric code that is an alternate numeric representation of a second character in the primary security key;
   adding, by the one or more processors, the first numeric code to the second numeric code to generate a running total value;

automatically designating, by the one or more processors, the running total value as a secondary security key such that the primary security key is transformed into the secondary security key that is usable for encrypting data to provide a more secure computer system; and encrypting, by the one or more processors, the data with the secondary security key.

2. The method of claim 1, wherein the first character and the second character are in sequential order within the primary security key.

3. The method of claim 1, further comprising:
decrypting, by the one or more processors, the encrypted data with the secondary security key.

4. The method of claim 1, further comprising:
receiving, by the one or more processors, an output of a hardware sensor;
designating, by the one or more processors, the output of the hardware sensor as a divisor;
dividing, by the one or more processors, the running total value by the divisor to generate a quotient and a remainder;
associating, by the one or more processors, the remainder with a mathematical operation; and
executing, by the one or more processors, the mathematical operation on the running total value to modify the secondary security key.

5. The method of claim 4, wherein the hardware sensor is a positioning device.

6. The method of claim 1, further comprising:
retrieving, by the one or more processors, a third numeric code that is an alternate numeric representation of a third character in the primary security key;
comparing, by the one or more processors, the third numeric code with the running total value;
in response to determining that the third numeric code is less than the running total value, subtracting, by the one or more processors, the third numeric code from the running total value to create a modified running total value; and
modifying, by the one or more processors, the secondary security key to match the modified running total value.

7. The method of claim 1, wherein the first numeric code and the second numeric code are American Standard Code for Information Interchange (ASCII) values.

8. A computer program product comprising one or more computer readable storage mediums, and program instructions stored on at least one of the one or more computer readable storage mediums, the stored program instructions comprising:
program instructions to receive a primary security key;
program instructions to retrieve a first numeric code that is an alternate numeric representation of a first character in the primary security key;
program instructions to retrieve a second numeric code that is an alternate numeric representation of a second character in the primary security key;
program instructions to add the first numeric code to the second numeric code to generate a running total value;
program instructions to automatically designate the running total value as a secondary security key such that the primary security key is transformed into the secondary security key that is usable for encrypting data to provide a more secure computer system; and
program instructions to encrypt the data with the secondary security key.

9. The computer program product of claim 8, wherein the first character and the second character are in sequential order within the primary security key.

10. The computer program product of claim 8, further comprising:
program instructions to decrypt the encrypted data with the secondary security key.

11. The computer program product of claim 8, further comprising:
program instructions to receive an output of a hardware sensor;
program instructions to designate the output of the hardware sensor as a divisor;
program instructions to divide the running total value by the divisor to generate a quotient and a remainder;
program instructions to associate the remainder with a mathematical operation; and
program instructions to execute the mathematical operation on the running total value to modify the secondary security key.

12. The computer program product of claim 11, wherein the hardware sensor is a positioning device.

13. The computer program product of claim 8, further comprising:
program instructions to retrieve a third numeric code that is an alternate numeric representation of a third character in the primary security key;
program instructions to compare the third numeric code with the running total value;
program instructions to, in response to determining that the third numeric code is less than the running total value, subtract the third numeric code from the running total value to create a modified running total value; and
program instructions to modify the secondary security key to match the modified running total value.

14. The computer program product of claim 8, wherein the first numeric code and the second numeric code are American Standard Code for Information Interchange (ASCII) values.

15. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
program instructions to receive a primary security key;
program instructions to retrieve a first numeric code that is an alternate numeric representation of a first character in the primary security key;
program instructions to retrieve a second numeric code that is an alternate numeric representation of a second character in the primary security key;
program instructions to add the first numeric code to the second numeric code to generate running total value;
program instructions to automatically designate the running total value as a secondary security key such that the primary security key is transformed into the secondary security key that is usable for encrypting data to provide a more secure computer system; and
program instructions to encrypt the data with the secondary security key.

16. The computer system of claim 15, wherein the first character and the second character are in sequential order within the primary security key.

17. The computer system of claim 15, further comprising:
program instructions to decrypt the encrypted data with the secondary security key.

18. The computer system of claim 15, further comprising:
program instructions to receive an output of a hardware sensor;
program instructions to designate the output of the hardware sensor as a divisor;
program instructions to divide the running total value by the divisor to generate a quotient and a remainder;
program instructions to associate the remainder with a mathematical operation; and
program instructions to execute the mathematical operation on the running total value to modify the secondary security key.

19. The computer system of claim 15, further comprising:
program instructions to retrieve a third numeric code that IS an alternate numeric representation of a third character in the primary security key;
program instructions to compare the third numeric code with the running total value;
program instructions to, in response to determining that the third numeric code is less than the running total value, subtract the third numeric code from the running total value to create a modified running total value; and
program instructions to modify the secondary security key to match the modified running total value.

20. The computer system of claim 15, wherein the first numeric code and the second numeric code are American Standard Code for Information Interchange (ASCII) values.

* * * * *